Sept. 1, 1925.  1,552,395
C. P. DEIBEL ET AL
METHOD OF PRODUCING DRY CELLS
Filed Dec. 15, 1924  2 Sheets-Sheet 1
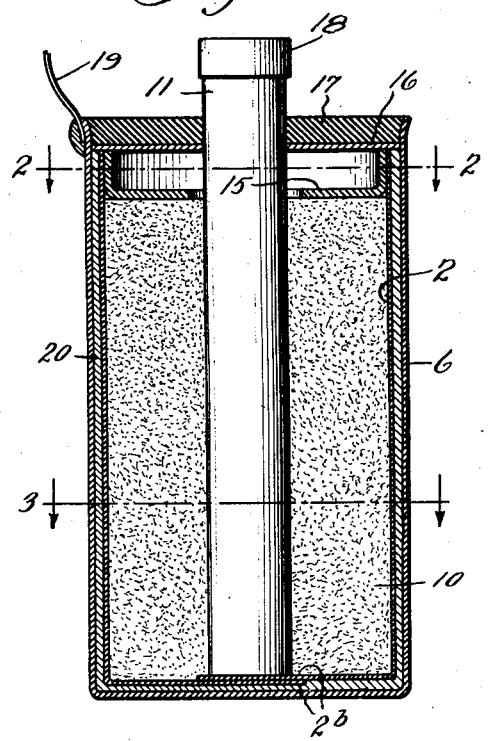
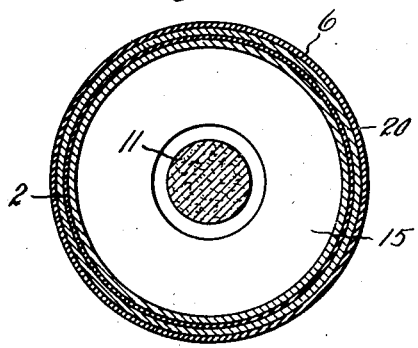
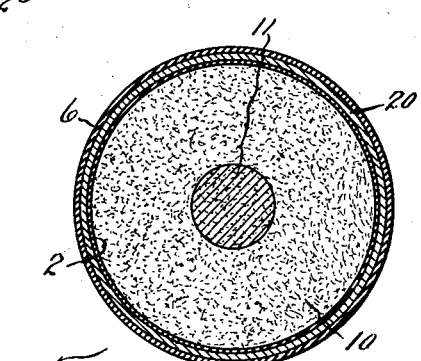

Sept. 1, 1925.  1,552,395
C. P. DEIBEL ET AL
METHOD OF PRODUCING DRY CELLS
Filed Dec. 15, 1924   2 Sheets-Sheet 2
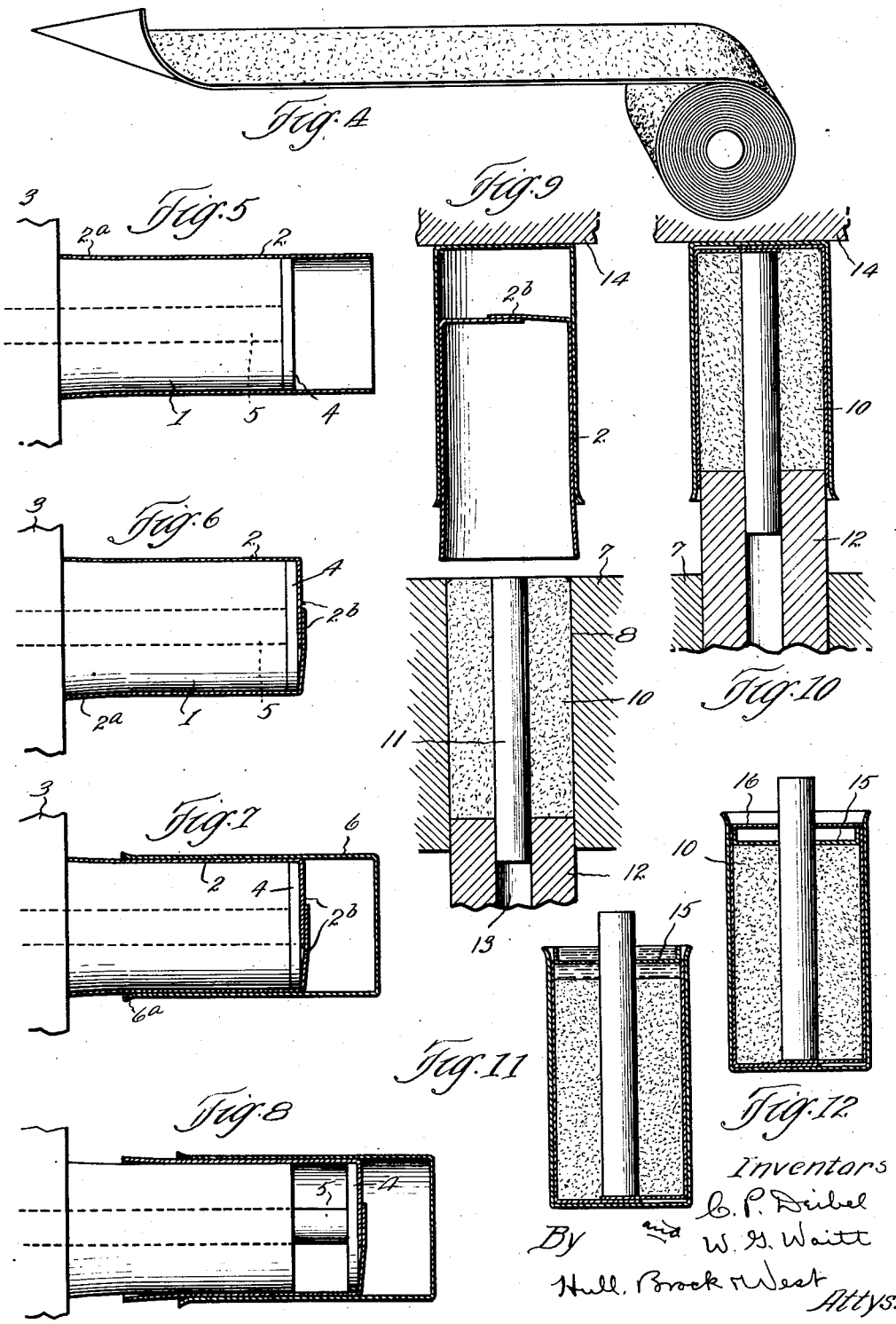

Patented Sept. 1, 1925.

1,552,395

UNITED STATES PATENT OFFICE.

CYRIL P. DEIBEL AND WALTER G. WAITT, OF LAKEWOOD, OHIO, ASSIGNORS TO THE TWIN DRY CELL BATTERY COMPANY, OF CLEVELAND, OHIO, A CORPORATION OF OHIO.

METHOD OF PRODUCING DRY CELLS.

Application filed December 15, 1924. Serial No. 755,877.

*To all whom it may concern:*

Be it known that we, CYRIL P. DEIBEL and WALTER G. WAITT, citizens of the United States, residing at Lakewood, in the county of Cuyahoga and State of Ohio, have invented a certain new and useful Improvement in Methods of Producing Dry Cells, of which the following is a full, clear, and exact description, reference being had to the accompanying drawings.

The aim of our invention is to provide a method of producing dry cells which is adapted to the facilities of automatic manufacture so that a great increase in production, with the resultant decrease in cost, is effected. Furthermore, such method of manufacture, made possible by the novel features of our invention, insures uniform high quality of product.

The need of such a process as that herein set forth has long existed, and with the advent of the radio it has become exceedingly stringent. Our process was evolved primarily for the production of so-called "B" batteries of radio sets because prevailing methods are quite inadequate and unsuited to the manufacture of the comparatively small cells of which such batteries are constituted. It is to be understood however that our invention is equally well adapted to the manufacture of dry cells of all sizes embracing those ranging from the smaller "flashlight" sizes to the standard 6 inch size.

It has been quite impossible to make batteries with any degree of rapidity by the methods heretofore employed without an occasional defective cell; and if one cell in the usual "B" battery of fifteen cells is defective, the entire battery is correspondingly defective. The battery as a whole is as good as, and no better than, its weakest cell.

The most prevalent defect in batteries as heretofore constructed, especially of the variety above emphasized, is contact of the mix with the zinc cup which constitutes the anode. When such contact exists the cell is rendered internally defective. To obviate this defect there must be an effective and permanent separation between the mix and the cup. Also, in the common forms of cells, no use is obtained from the bottom of the zinc cup. By virtue of our improved method, the bottom of the cup is just as available for use as the side walls.

Also, in cells constructed according to prevailing practice, expensive low resistance materials have to be used in order that the cell may properly function under relatively heavy current drains. This employment of expensive low resistance materials is obviated, in our improved method of manufacture, by highly compressing the mix and thus reducing internal resistance.

A further advantage accruing from our improved process is that more mix may be used in a cup of a given size than was the case with the previously described process. This, with the added use of the bottom of the cup, enables the cell to better maintain its voltage under a given drain and materially increases its life.

Cells constructed in accordance with our method of production are hermetically sealed, and include an air space or chamber of ample size to take care of the expansion and contraction of air or other gases within the cell, thus preventing the seal from becoming broken through either excess or negative internal pressure.

The method.

Our improved method consists in forming a piece of suitable absorbent material, such as a strip of bibulous paper, void of sizing, and of proper width, into such shape as will adapt it for use as a lining for the cup of zinc or equivalent material which constitutes the anode of the cell. For example, if the cup is of the usual cylindrical shape, the strip of paper is wound to effect a cylinder of one or more thicknesses of paper, and one end of the cylinder thus formed is folded inwardly to produce a bottom. Prior to forming the lining in the manner described, the paper whereof it is constructed is coated with a suitable flour or starch paste, and the paste and paper are allowed to thoroughly dry so that the paper may regain its original strength, and be rendered more convenient of handling.

The lining is then inserted into a cup, and to facilitate assembly, as shall hereinafter appear, the open ends of the cup and lining are slightly flared. The flaring of the open end of the cup facilitates insertion of the lining, and, in order to prevent the flared end of the lining from becoming contracted until such time as this is desired, the lining is initially inserted only part way into the cup.

A cake of depolarizing mix, molded or otherwise formed to a size which will enable it to be readily inserted into the lining, and containing the cathode, is introduced into the lined cup, and when the advancing end of the cake engages the folded bottom of the lining it moves the lining with it to the bottom of the cup. The lining is preferably somewhat more shallow than the cup so that its open end will be spaced from the corresponding end of the cup a distance substantially equal to the thickness of a layer of sealing material which shall ultimately close the cup. Pressure of a comparatively high degree is brought to bear upon the cake of mix thereby thoroughly compacting it within the cup with the lining squeezed between it and the wall of the cup. The fact that the material of the lining is dry during this action, obviates all danger of its being torn or otherwise injured.

A washer of cardboard or other suitable material is now placed in the open end of the cup to approximately the depth of the open end of the lining, and this washer is preferably dished to provide a peripheral flange or wall which extends upwardly to about the top of the cup. A suitable quantity of water or electrolytic solution is now poured into the top of the cell, preferably directly into the dished washer, and this flows down into and about the mix, thoroughly saturating the absorbent material or paper of the lining and softening the paste. This liquid fills the pores of the material or paper, thereby making solution contact between the mix and the cup. After the liquid has been absorbed, the dished washer is pressed down against the top of the cake of mix, and a flat washer having a diameter substantially equal to the internal diameter of the cup, is placed in the top of the cup and brought to bear at its edge upon the top edge of the lining and the peripheral flange or rim of the dished washer. The space above this flat washer is then filled with a suitable sealing material which is allowed to harden, and this completes the cell except for the application of suitable terminals to the cathode and anode.

Attention is called to the fact that the sealing material contacts with that part of the wall of the cup which projects above the lining. Consequently there is no paste present between this material and the wall which would prevent a proper bond. Also it will be observed that the space between the bottom of the dished washer and the flat washer allows for expansion and contraction of gases or air within the cell, such as may be due to fluctuations in temperature, thus preventing the same from loosening the seal.

Drawings.

A product of our invention, and an approved means of carrying the method into practice, are illustrated in the accompanying drawings wherein Fig. 1 is a central vertical section through a cell produced in accordance with our invention; Figs. 2 and 3 are transverse sections through the cell on the respective lines 2—2 and 3—3 of Fig. 1; Fig. 4 is a perspective view of a roll of paper from which the lining is formed; and Figs. 5 to 12 illustrate the successive steps of the process of method.

Specific means for practicing the method.

The absorbent material which we prefer to employ for the lining is a paper of the "kraft" variety which is made by the so-called sulphate process. By this process the fibers of the paper are not shortened nor injured and the product is thus insured of being very strong. A suitable flour or starch paste is applied to one side of the paper and it and the paper are allowed to thoroughly dry before the paper is used. For convenience of handling, the paste-coated paper may be put up in rolls, one of such rolls being shown in Fig. 4, and the stippling on one side of the paper is intended to indicate the coating of paste. A piece of this paper of suitable length is wrapped about a mandrel 1 (Fig. 5) to form the lining 2, the coating of paste being on the outer side. The mandrel is shown as carried by a suitable support 3, and its inner end adjacent the support is slightly tapered so as to flare the corresponding end of the lining, as indicated at $2^a$. An ejector 4 normally rests against the outer end of the mandrel and constitutes an extension thereof, and the same is adapted to be projected by a rod 5 or the like which extends centrally through the mandrel and has its outer end connected to the ejector. The end of the lining protruding beyond the mandrel is next folded inwardly over the ejector 4, as indicated at $2^b$. This step of the process is illustrated in Fig. 6.

As shown in Fig. 7, a cup 6 is next applied to the lining 2 and for a reason presently to be explained is shoved only part way onto the lining. To facilitate the application of the cup to the lining, the open end of the cup is flared, as at $6^a$.

The cup and lining, thus assembled, are now removed from the mandrel, the operation being initiated, as shown in Fig. 8, by the ejector 4 which is advanced through the medium of the rod 5.

The cup, with the lining protruding there-from, is now inverted over a mold or container 7 (Fig. 9) having a cavity 8 within which reposes a cake 10 of a suitable depolarizing mix which contains the cathode 11, consisting of a carbon rod or pencil. The cake 10 is supported upon a plunger 12 that fits the cavity 8 and has a bore 13 for the accommodation of the cathode 11. The cup rests with its closed end against an abutment 14.

As the next step, illustrated in Fig. 10, the plunger 12 is advanced to transfer the cake 10, with the cathode 11, from the mold cavity 8 to the cup, the cake freely entering the flared end of the lining 2 and upon engaging its folded bottom $2^b$, carries the lining with it to final position within the cup. Sufficient pressure is imposed, through the plunger 12, upon the cake 10 to thoroughly compact it within the cup and impart to it the desired density.

A dished washer 15 is next inserted within the open end of the cup to about the level of the top edge of the liner. With the cup upright, as shown in Fig. 11, water or an electrolytic solution is poured into the dished washer and flows down about the cathode and into the mix and paper, thoroughly saturating the paper and softening the paste carried thereby. After the water or solution has been absorbed, the washer 15 is pressed down against the mix (Fig. 12) and a flat washer 16 is placed in the open end of the cup with its edge portion bearing against the edges of the lining and the flange or rim of the dished washer.

A sealing material, designated 17 in Fig. 1, is introduced into the top of the cup. The usual metallic cap 18 is applied to the cathode 11 to facilitate attachment of a conductor, and a terminal designated 19 is soldered or otherwise secured to the cup. The paste, increased in volume through the effects of the water or solution, is designated 20 in Figs. 1, 2 and 3.

Having thus described our invention, what we claim is:—

1. The method of producing dry cells comprising the steps of forming a lining for the cup from a piece of comparatively stiff and tough absorbent material wound about in one or more layers to conform to the shape of the cup and folding the end of the lining inwardly to provide a cover for the bottom of the cup; inserting said lining part way into the cup; projecting a cake of mix containing the cathode into the lined cup and forcing it, with the lining, to the bottom of the cup and compressing said mix; introducing a suitable liquid into the cup for saturating the lining and softening the paste; covering the mix with a piece of suitable material, and sealing the cup.

2. The method of producing dry cells comprising the steps of forming a lining for the cup from a piece of tough absorbent paper carrying a quantity of dry paste, said forming being effected by winding the paper about an axis in one or more layers to conform to the internal size and shape of the cup and folding one end of the lining inwardly to constitute a covering for the bottom of the cup and flaring the opposite end of the lining; inserting the lining part way into the cup; projecting a cake of mix into the lined cup and forcing it with said lining to the bottom of the cup and compressing the mix; inserting a dished washer into the cup and leaving it temporarily spaced from the mix; pouring a suitable liquid into the dished washer and allowing it to flow down about the mix to thoroughly saturate the paper lining and soften the paste; forcing the dished washer against the mix; placing a second washer within the cup in juxtaposition to the open end of the lining and the rim of the dished washer, and closing the cup with a suitable sealing material.

3. The method of producing dry cells comprising the steps of winding a piece of absorbent paper one or more times about a mandrel and folding the paper over the end of the mandrel, thereby to produce a lining for the side walls and bottom of the cup; placing the cup over the lining while supported by the mandrel, leaving a part of the lining projecting from the open end of the cup; removing the cup with the lining from the mandrel and supporting it in inverted position over and in axial alignment with a mix container, transferring from said container a cake of mix containing the cathode into the lined cup and forcing it with the lining to the bottom of the cup and compressing the mix; placing a dished washer within the cup and leaving it temporarily spaced from the mix; introducing a suitable liquid into the cup and allowing it to flow about the mix and thoroughly saturate the lining and soften the paste; pressing the dished washer against the mix; placing a second washer in the cup in juxtaposition to the open end of the lining and the rim of the dished washer, and closing the cup with a suitable sealing material.

4. The method of producing dry cells, the steps of forming a lining for the cup from a piece of dry comparatively thin and tough absorbent paper; inserting the lining within the cup; compressing a dry depolarizing mix within the lining while the lining is dry, and introducing a suitable liquid into the cup for saturating the lining and wetting the mix; and sealing the cell.

5. The method of producing dry cells comprising the steps of forming a lining for the cup from a piece of comparatively thin and tough absorbent paper which has previously been coated with a suitable paste;

inserting the lining within the cup while the lining is completely dry; compressing a substantially dry depolarizing mix within the lining; introducing a suitable liquid into the cup for saturating the lining, softening the paste and wetting the mix; covering the end of the mix with a piece of suitable material, and sealing the cup.

6. In the method of producing dry cells, the steps of covering the active surface of the negative element with a comparatively thin bibulous paper lining carrying a quantity of paste; while lining and paste are in a dry condition compressing a suitable depolarizing mix against said covered surface; saturating the mix and lining with a suitable liquid.

7. In the method of producing dry cells, the steps of pre-shaping a lining and inserting said lining into a cell; compressing a depolarizing mix within the lining while the same is in dry condition; saturating said mix and lining with an electrolytic solution; and sealing the cell.

8. The method of producing dry cells comprising the steps of covering the active surface of the negative element with one or more layers of absorbent material carrying a starchy paste in a dry state; applying and compressing a suitable depolarizing mix against the lining; saturating said mix and lining with a suitable liquid; sealing the cell.

9. In the method of producing dry cells, the steps of wrapping a piece of dry, paste laden absorbent material about a mandrel and folding the ends of the material completely over the end of the mandrel to form a lining for the cup; inserting the lining within the cup; inserting and compressing an electrode and a suitable depolarizing mix within the cup while the lining is dry, and saturating the lining and wetting the mix with a suitable liquid.

10. The method of producing dry cells comprising the steps of forming a lining for the cup by wrapping a piece of dry thin absorbent paper about a mandrel, the paper having been previously coated with a starchy paste; inserting the lining within the cup while dry, inserting and compressing an electrode and a suitable depolarizing mix within the lining while the lining is dry; saturating the mix and lining with a suitable liquid; and sealing the cup.

11. In the method of producing dry cells, the steps of forming a lining for the cup by wrapping a piece of thin, dry, paste laden absorbent material about a form, said forming being effected by winding the material about the form in one or more layers to conform to the internal size and shape of the cup and folding one end of the lining inwardly to constitute a covering for the bottom of the cup; inserting the lining into the cup; inserting and compressing an electrode and a depolarizing mix within the cup while the lining is dry; and saturating the lining and wetting the mix with a suitable liquid.

12. In the method of forming dry cells, the steps of forming a lining for the cup by wrapping a piece of thin absorbent material about a form, said forming being effected by winding the material about the form in one or more layers to conform to the internal size and shape of the cup and folding one end of the lining inwardly to constitute a covering for the bottom of the cup; inserting the lining into the cup; projecting a substantially dry cake of depolarizing mix into the lined cup and compressing the same; substantially filling said cup with a suitable liquid to saturate the mix and lining; covering said mix with a suitable material; and sealing the cup.

13. The method of producing dry cells comprising the steps of lining sides and bottom of the cup, with one or more integral layers of thin, dry, tough absorbent material coated with a quantity of dried paste; inserting an electrode and a substantially dry depolarizing mix into the lined cup and compressing it therewithin; substantially filling the cup with a suitable liquid for saturating the lining and mix and softening the paste; allowing the cup to stand for an appreciable time to allow the solution to be absorbed; covering the end of the mix; and sealing the cup.

14. The method of producing dry cells comprising the steps of forming a lining for the cup by wrapping about a suitable mandrel a piece of thin, dry, absorbent material, coated with a quantity of dried paste, folding one end of the lining inwardly to constitute a covering for the bottom of the cup; inserting the lining into the cup, while in the dry condition; inserting an electrode and a substantially dry depolarizing mix within the lining and compressing it therewithin; substantially filling the cup with a suitable liquid for saturating the lining and mix and softening the paste; allowing the mixture to stand to allow the solution to be absorbed; covering the end of the mix with a piece of suitable material; placing a second piece of material within the end of the cup in spaced relation to the first piece; and sealing the cup.

In testimony whereof, we hereunto affix our signatures.

CYRIL P. DEIBEL.
WALTER G. WAITT.